March 21, 1939. R. DE LISO 2,150,892
METHOD OF LASTING SHOES
Original Filed May 25, 1934 5 Sheets-Sheet 1

INVENTOR.
RALPH DE LISO
BY
ATTORNEY.

March 21, 1939.  R. DE LISO  2,150,892
METHOD OF LASTING SHOES
Original Filed May 25, 1934  5 Sheets-Sheet 4
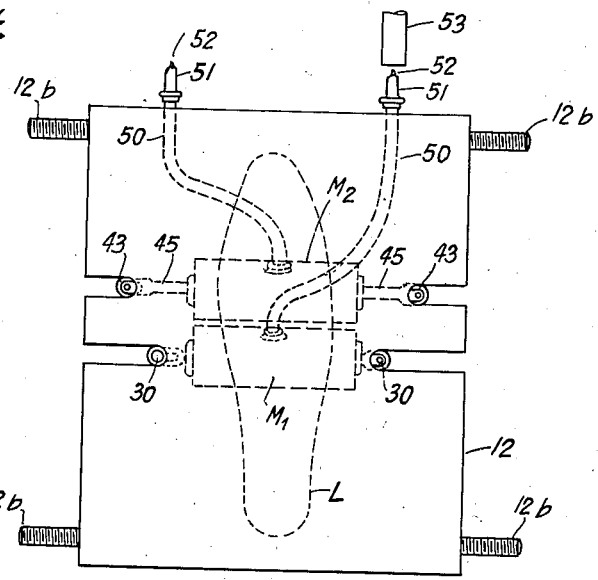
Fig. 4.
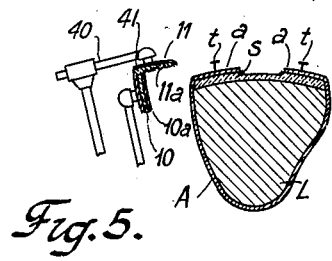
Fig. 5.
Fig. 6.
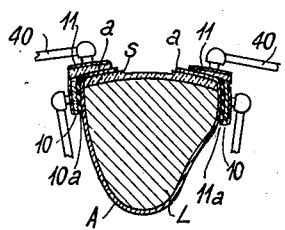
Fig. 7.
INVENTOR.
RALPH DE LISO
BY
ATTORNEY.

March 21, 1939.  R. DE LISO  2,150,892
METHOD OF LASTING SHOES
Original Filed May 25, 1934   5 Sheets-Sheet 5

INVENTOR.
RALPH DE LISO
BY
ATTORNEY.

Patented Mar. 21, 1939

2,150,892

UNITED STATES PATENT OFFICE 2,150,892

METHOD OF LASTING SHOES

Ralph De Liso, Brooklyn, N. Y.

Original application May 25, 1934, Serial No. 727,416. Divided and this application November 25, 1936, Serial No. 112,628

2 Claims. (Cl. 12—145)

This application is a division of my prior application Ser. No. 727,416, filed May 25, 1934.

The present invention relates to the manufacture of cemented shoes and more particularly to an improved process of securing the marginal portions of the upper materials, hereinafter referred to as the upper, to the insole in overlying relation thereto.

In the manufacture of shoes in which the marginal portions of the upper are secured by an adhesive in overlying relation to the insole, the upper is lasted and the marginal portions thereof are first secured to the insole temporarily by tacks or similar fasteners. Subsequently the tacks are removed, an adhesive is applied to said marginal portions, and then a large number of tacks is driven in, usually by a nigger head progressive type lasting machine, to secure said marginal portions to the insole and to hold the upper in lasted relation until the adhesive is set and a good adhesive bond between the upper and insole is obtained, after which the tacks are removed.

One object of the present invention is to eliminate the use of tacks or similar fasteners, after the application of the adhesive, particularly at the opposite sides of the marginal portion of the upper between the toe-end and heel-end portions of the shoe, for holding the upper in lasted relation and for securing said side marginal portions to the insole until the adhesive has set.

Another object of the invention is to provide improved means for holding the marginal portions of the upper, after the application of the adhesive, in firm engagement with the insole until the adhesive has set.

A further object is to provide means for disposing the marginal portions of the upper, after the application of the adhesive, in smooth engagement with the insole and for drawing said portions tightly inwardly in overlying relation to the insole.

Heretofore in the manufacture of cemented shoes as described above it was necessary in the case of shoes, particularly ladies' shoes, having spaced portions, such a straps in shoe of the sandal type, to mark on the insole the positions of the marginal portions of the spaced upper portions or straps with respect to the insole to enable the shoemaker to restore said marginal portions in their proper lasted positions on the insole after the tacks are removed and the adhesive is applied.

Another object of the invention is to hold the spaced upper portions or straps in proper position during the removal of the tacks and the application of the adhesive, as well as during the time required for the cement to set or until the marginal portions or said upper portions become firmly bonded to the insole, thereby maintaining the upper at all times in proper lasted relation and eliminating the necessity for marking the insole.

Another object of the invention is to provide means for holding the upper in lasted relation during the removal of the tacks and the application of the adhesive.

A further object of the invention is to eliminate or to greatly minimize shoe damages due to staining of the shoe uppers by the cement employed in making cemented shoes and by handling the shoe.

A further object is to provide a method of and apparatus for accelerating the lasting of cemented shoes.

A yet further object is generally to improve the art of manufacturing cemented shoes.

For a complete understanding of the invention reference is to be had to the following description considered in connection with the accompanying drawings.

In the drawings:

Figure 4 is a top plan view of a lasting unit, with parts omitted;

Figures 5 and 7 are viewed, more or less diagrammatic, illustrating steps in the present method;

Figure 1:
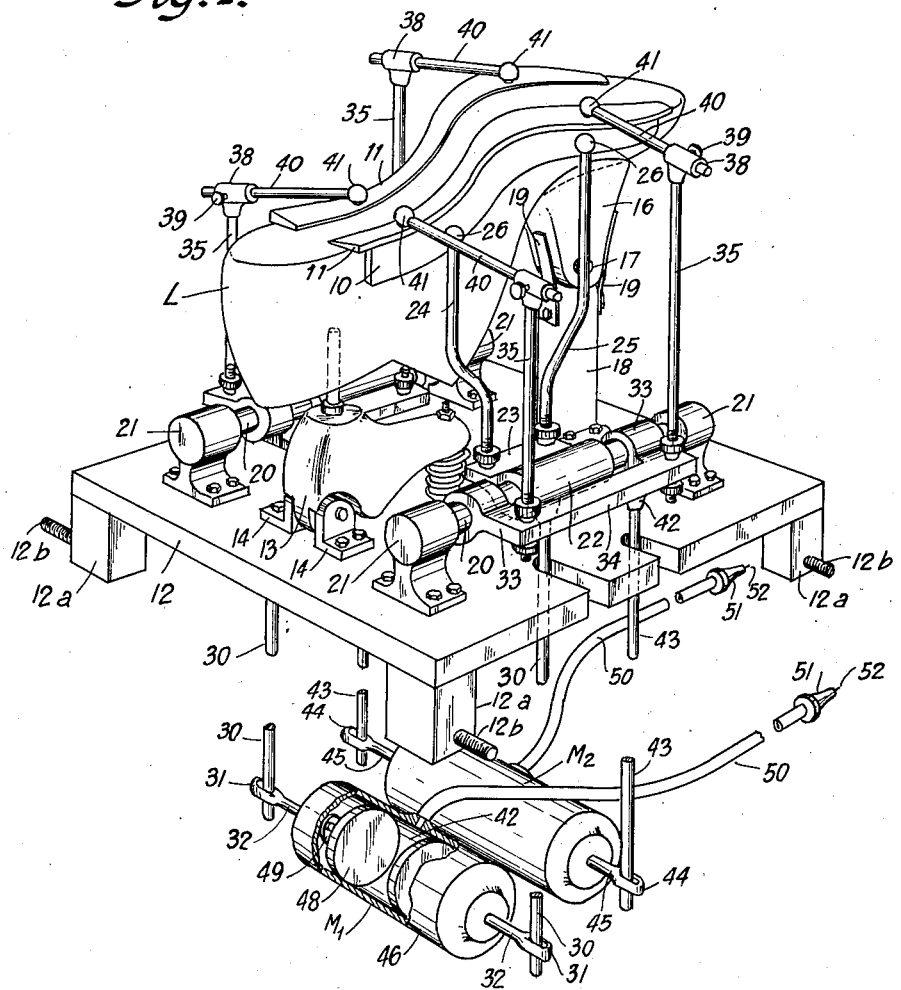
Figure 1 is a perspective view of a lasting unit, showing parts thereof out of normal position, for the sake of clearness in illustration.

According to the present invention, in making cemented shoes, the upper A is lasted and temporarily secured to an insole S on a last L by temporary fastening means, such as tacks $t$ which engage the marginal upper portions $a$ at the shoe bottom overlying the insole $S$, as illustrated diagrammatically in Figure 5. The tacks may be applied in any suitable way, but I prefer to apply the tacks at the heel and toe portions of the shoe on a bed lasting machine and to apply the tacks at the marginal side portions of the upper, i. e., the portions between the heel and toe portions of the upper, by an ordinary hammer. After the upper is thus lasted, it is clamped to the sides of the last, adjacent the last bottom, by means of a clamp here shown as side-clamps 10, as illustrated in Figure 6. Then, while the upper is thus clamped and held in position in lasted relation, the tacks are removed from the marginal side portions of the upper between the toe and heel portions thereof or, in other words, the marginal side portions of the upper are released while the rest of the upper is held in lasted relation by the side-clamps 10 and by the tacks at the heel and toe portions of the shoe. Then the inner surfaces of the marginal side portions a of the upper are roughened and rendered adhesive, by applying a suitable wet adhesive, such as Celluloid cement, or by conditioning a previously applied adhesive by treating the same with heat and/or a solvent therefor to render the same tacky, after which said side portions of the upper are pressed against the insole in overlying relation thereto, as shown in Figure 7 by means of clamp-wipers 11 which engage the marginal side portions a, wipe them smoothly, and draw them tightly toward each other over the insole where they are held until the cement has set. This method of lasting cemented shoes will be described more in detail in the course of the following description of the apparatus, which is preferably employed in performing this method, but it will be understood that other tools and devices may be employed in performing the steps of this method.

Referring to Figures 1 to 4, there is shown a lasting unit comprising a frame or base 12 having a last jack 13 pivotally mounted at one end in brackets 14 and spring pressed downwardly at its other end by a rather strong tension spring 15 secured to the last jack 13 and to the frame 12. A toe rest 16 is pivotally mounted at 17 on an upstanding post 18 secured to the base 12. Flat springs 19 are secured at opposite sides of the bracket 18 and engage opposite sides of the toe rest 16 for yieldingly holding the latter in position. The last L, carrying the shoe in the condition shown in Figure 5, is placed on the jack-pin 13a with the forward vamp portion of the shoe in engagement with the toe rest 16, which has a curvature corresponding to said vamp portion. The tension spring 15 exerts a strong pressure on the jack 13 and thereby holds the lasted shoe with considerable force on the jack and against the toe rest. Said spring 15 is, however, sufficiently yieldable to permit the last to be quickly mounted and removed.

On opposite sides of the shoe support constituted by the last jack 13 and the toe rest 16 are mounted mechanisms for operating the side clamps 10 and the clamp-wipers 11. For this purpose there are provided bars or shafts 20 supported at their ends in brackets 21 secured to the base 12. For operating the side clamps 10, a central sleeve 22 is pivotally mounted on each of the shafts 20 and is provided with an inwardly directed plate 23 to which are adjustably secured, in spaced relation, upwardly extending arms 24 and 25 securely connected at their upper ends to the side clamps 10, preferably by ball and socket connections 26. The ends of the arms 24 and 25 are provided with lower threaded portions 27 which pass through openings in the sleeve plates 23 and are engaged by nuts 28 on opposite sides of the plates 23 whereby to secure the arms 24 and 25 releasably in adjusted position. The sleeves 22 are provided with threaded bosses 29 to which are connected operating rods 30 which depend from said bosses and are engaged at their lower ends by the slotted end portions 31 of the piston rods 32 of the motor M—1, which will be described subsequently more in detail.

For operating the clamp-wipers 11 there are provided the end sleeves 33 pivotally mounted on each shaft 20 and connected by an outwardly extending plate 34. Upwardly extending arms 35 have lower threaded portions 36 which pass through openings in the sleeve-plates 34 and are releasably secured in adjusted position by nuts 37 which engage opposite sides of the sleeve-plates 34. The upper ends of the arms 35 are provided with sleeves 38 having set screws 39 for adjustably securing the actuating rods 40 which are connected to the clamp-wipers 11, preferably by ball and socket connections 41. The sleeve plates 34 are provided with threaded bosses 42 which are engaged by rods 43 depending therefrom and engaging the slotted ends 44 of the piston rods 45 of the motor M—2 which is of the same construction as motor M—1.

Figure 2:
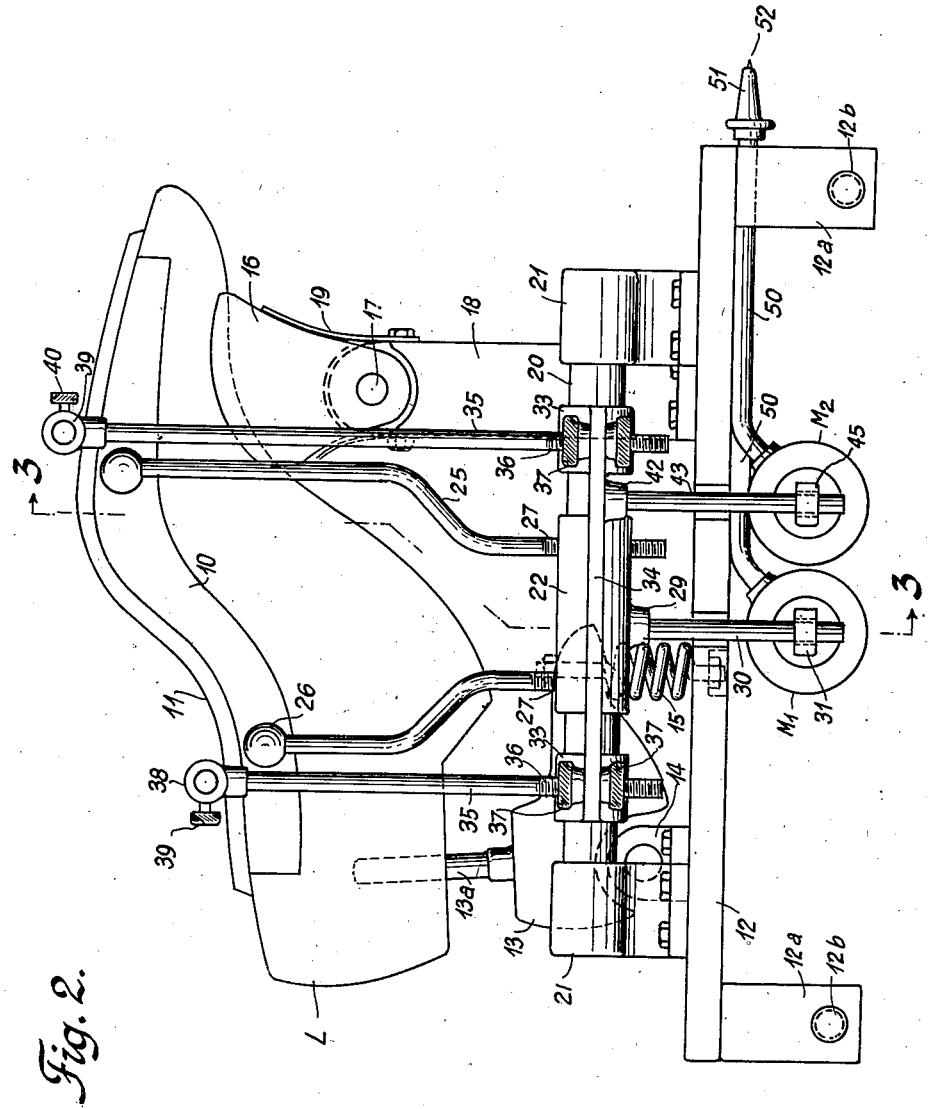
Figure 2 is a side view of the lasting unit.
Figure 3:
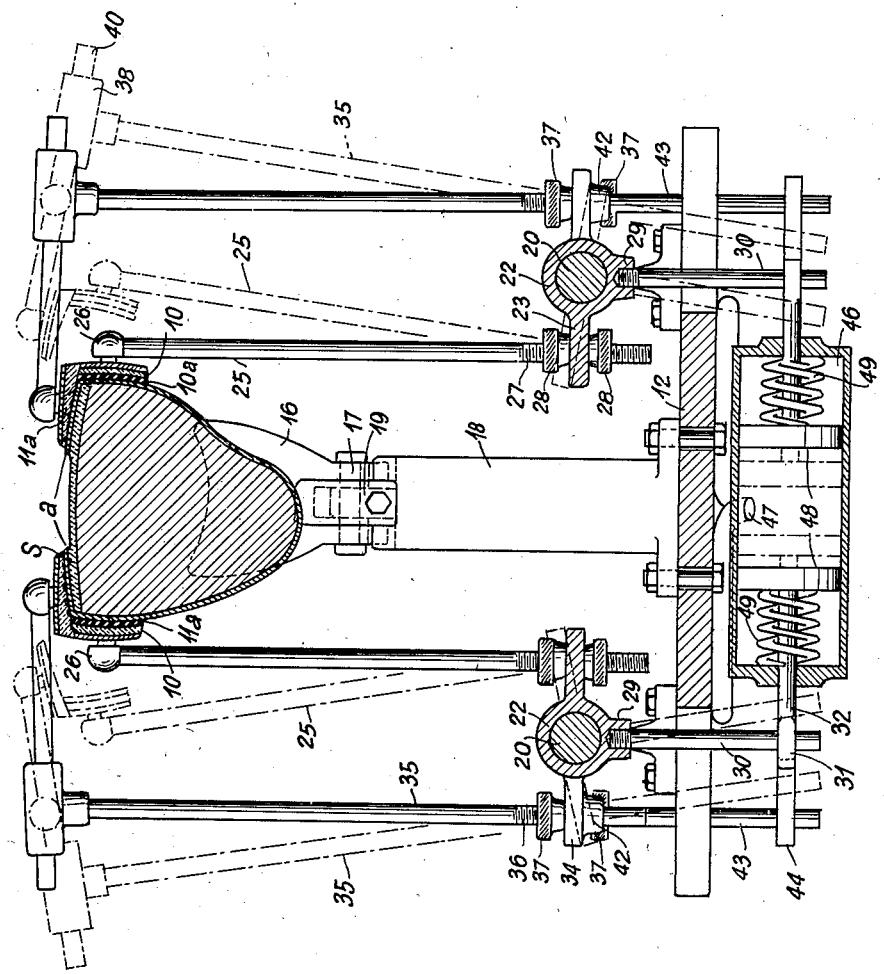
Figure 3 is a section on the line 3—3 of Figure 2.

In Figure 1, the motors M—1 and M—2 and the associated parts are shown displaced from normal position for the sake of clearness of the illustration. The normal position of said motors and associated parts is shown in Figures 2 and 3 from which it will be seen that the motors are mounted on the under surface of the frame 12 and preferably do not extend below the legs 12a of said frame. As the motors M—1 and M—2 for actuating the clamp mechanisms are of the same construction, only motor M—1 will be described in detail.

Referring to Figures 1 and 3, the motor comprises a cylinder 46 having a centrally disposed combined inlet and outlet port 47. The pistons 48 are moved away from each other against the springs 49 by the pressure of the motive fluid admitted through the port 47 and are moved toward each other by said springs when the fluid pressure is released. Fluid motors and compressed air for operating the motors are preferred, but other motors and other motive fluids may be used. An air pipe 50 is connected at one end to the port 47 in each motor and is provided at its opposite end with a check-valve 51 which is normally closed and which may be opened by inward movement of the valve stem 52. This valve is of a well known type commonly used on the inner tubes of vehicle tires and needs no further description. At predetermined times during the operation of the apparatus compressed air is admitted to the pipes 50 from a suitable tank (not shown) through an automatic nozzle 53 (Fig. 4) which is brought into engagement with the valve 51 for this purpose. The nozzle 53 is of the type commonly used at air service stations for supplying air to vehicle tires. As will be readily understood, without further description, this nozzle comprises a valve which is normally closed and which is opened when the nozzle is brought into engagement with the valve stem 52. At predetermined times during the operation of the apparatus, the compressed air will be exhausted from the motors M—1 and M—2 by opening the valves 51 which is accomplished by moving the valve stems 52 inwardly. The admission and exhaust of compressed air or other motive fluid may be accomplished automatically at the proper times during the operation of the apparatus, as will subsequently appear.

In operating the above described apparatus, in performing the method of the present invention the lasted shoe in the condition illustrated in Figure 5 is placed on the support in which position it is held securely by the spring 15. At this time, the side clamps 10 and the clamp-wipers 11 are in the position shown, out of engagement with the shoe as illustrated in full lines in Figure 5 and in dotted lines in Figure 3 with the motor pistons 48 of both motors and the actuating arms 24, 25 and 35 in the dotted line position shown in Figure 3. Then, motive fluid is admitted to motor M—1 to cause the rods 30 engaged by the piston rods 32 to move the sleeve-plate 23 and the arms 24 and 25, thereby moving the side clamps 10 into operative position against the sides of the shoe in the position shown in Figure 6 and in full lines in Figure 3, the clamp-wipers 11 being still out of engagement, or inoperative, as illustrated in Figure 6. The operator then removes the tacks from the marginal upper side portions a, lifts said portions a away from the insole, as shown in Figure 6, and then roughens their inner surfaces and applies the cement. Before removing the tacks the operator may trim the inner edge portions of the marginal side portions a. When a rand-insole is used, for example, such as that shown in the patent to Sbicca No. 1,902,725, it is desirable to remove enough of said edge portions to expose the insole rand whereby a direct adhesive connection between the insole and outsole is obtained when the latter is applied and cemented in position. Then motive fluid is admitted to the motor M—2 causing piston rods 45 to move the sleeve plates 34, the arms 35, and rods 40, thereby causing the clamp-wipers 11 to wipe over the upper portions a, turning them down into engagement with the insole in overlying relation thereto and pressing and holding them securely against the insole, as illustrated in Figure 7. The side-clamps 10 and the clamp-wipers 11 are maintained in clamping relation until the cement has set or until a good adhesive bond is secured between the upper and the insole, after which the motive fluid is released from both motors M—1 and M—2, to permit the springs 49 to move the clamp actuating arms 24, 25 and 35 and the clamps actuated thereby to inoperative position. The lasted shoe is then removed from the support, and the shoe may be completed as usual.

The side-clamps 10 have rubber coverings 10a to protect the materials of the upper engaged by these clamps against damage. The clamp wipers 11 are roughened or corrugated as indicated at 11a to cause said member to grip the material and force it smoothly over the insole. It will be observed that the clamps 10 and 11 conform generally to the curvature of the shoe at the portions engaged thereby and, as here shown, said clamps extend only between the heel and toe portions which, as previously described, are maintained in lasted relation by the tacks applied on the bed lasting machine. The rods 40 which are secured to the clamp-wipers 11 may be adjusted in the sleeves 38 so as to obtain sufficient movement of the clamp-wipers 11 transversely of the last bottom to cause said wipers to properly tension the marginal side portions a and move them inwardly over the last bottom smoothly over the insole.

It will be understood that in lieu of the pneumatic motors, I may employ other means, such as suitably actuated cam mechanisms operated by one or more electric motors, for actuating the clamp operating mechanisms, but I prefer to use motors of the type shown, more particularly because this type of motor facilitates the regulation of the pressure exerted by the clamping members on the portions of the lasted shoe engaged thereby. Also, in clamping the sides of the shoe upper by the clamps 10 before removing the tacks t to permit the release of the side marginal portions a, it is desirable to make certain that the side clamps are in firm engagement with the sides of the upper, so that the latter will be held securely when the tacks t are removed and that the upper is smoothly positioned on the last before the clamps are fully operated. This can be accomplished by admitting enough air to move the clamps into a preliminary operative engagement with the shoe so that their position and the condition of the upper on the last can be observed before the side clamps are fully operated. If the upper is smooth on the last and the side clamps in proper relation thereto, more air can then be admitted to move the side clamps to final operative position.

Figure 8:
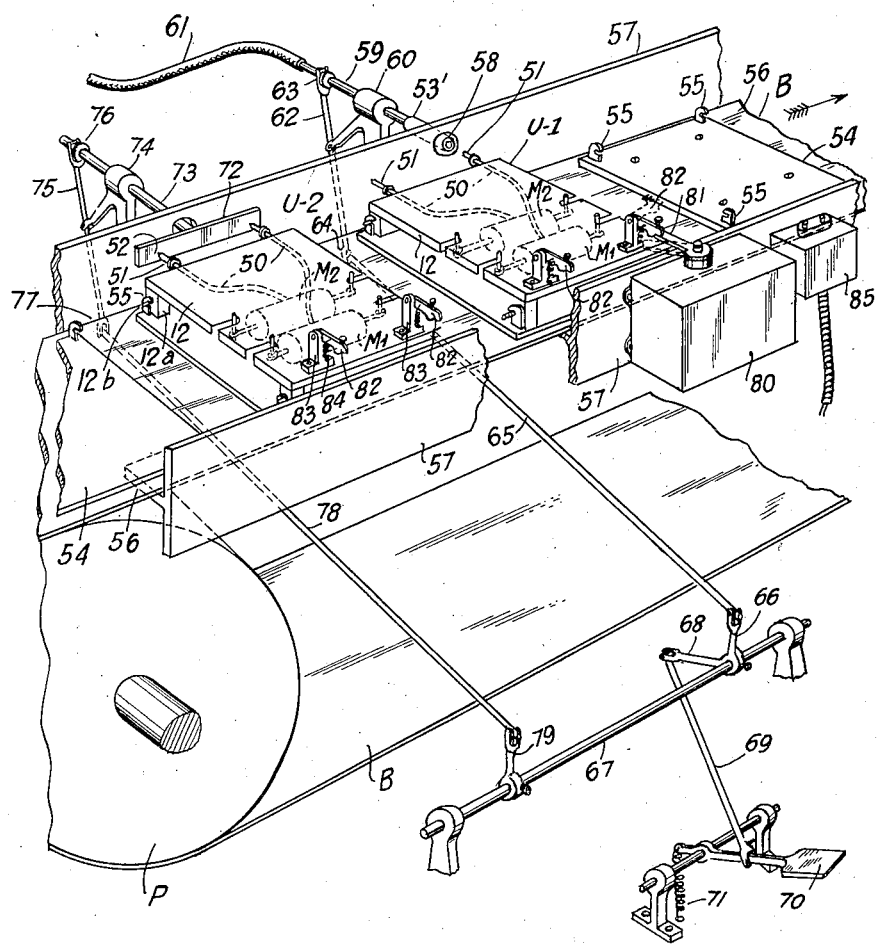
Figure 8 is a perspective view with parts omitted, of a multi-unit apparatus.

In Figure 8 there is shown a multi-unit lasting apparatus associated with a conveyor and means under the control of the operator for operating the conveyor and the several lasting units. As here shown, the conveyor comprises a flexible endless conveyor belt B, which passes over end pulleys P, as will be readily understood, although only one of said pulleys is shown. The conveyor belt B may be operated in any suitable way, as by an electric motor (not shown) connected to the shaft of one of the pulleys P. Said belt B carries, secured thereto, a plurality of longitudinally spaced metal plates 54 each of which constitutes a support or securing means for a lasting unit such as that shown in Figures 1 to 4 described above. For this purpose the base 12 of the lasting unit is provided with lugs 12b for engagement by the hooks 55 on the plates 54, although any other securing devices may be employed. The upper tract of the belt B passes over longitudinally extending flanges 56 on the side rails 57 of the frame of the apparatus, and said plates 54 overlap said flanges whereby said plates have a rigid bearing thereon when the belt is at rest. The air supply nozzle 53', which is of the same type as the nozzle 53 shown in Figure 2, is mounted for movement, through an opening 58 in the side rail 57, toward and away from the valve 51 on the lasting unit. For the purpose, said nozzle is connected to an air pipe 59 which is slidable in a stationary bracket 60 and is connected to a flexible air supply pipe 61. The pipe 59 is moved by a link 62 pivotally mounted on the bracket 60 and is connected at its upper end to said pipe by a pivotal connection 63 and at its lower end by a pivotal connection 64 to a link 65 which is connected to one arm 66 of a bell crank lever that is fixedly secured to a rotary shaft 67. The other arm 68 of the bell crank lever is connected by a link 69 to a treadle lever 70 to which a tension-spring 71 is connected. It will be understood that when the nozzle 53' and a valve 51 are in alignment, the nozzle 53' can be moved into engagement with the valve by actuating the treadle 70, to supply compressed air or other motive fluid to one of the motors on the lasting unit, and that when the treadle 70 is released the spring 71 will move the nozzle 53 to retracted position out of engagement with the valve 51.

For exhausting the air or other motive fluid from the motors M—1 and M—2 on a lasting unit, there is provided a movable bar 72 carried by a rod 73 slidably mounted in a bracket 74. A link 75 pivotally mounted on the bracket 74 has a pivotal connection 76 with the rod 73, and at its lower end said link has a pivotal connection with a link 78 which is pivotally connected to a lever 79 fixedly secured to the shaft 67. Thus, when the foot treadle 70 is operated to bring the nozzle 53' into engagement with a valve 51 on one lasting unit, the rod 73 is simultaneously moved to bring the bar 72 into engagement with both valves 51 on another lasting unit thereby opening said valves, by pressing on the valve stems 52, and releasing the air from both motors on said unit. It will be understood, however, that, if desired, the bar 72 may be operated independently of the nozzle 53', by any suitable means. Instead of fluid motors, electric motors and mechanisms actuated thereby may be employed and circuit controllers may be provided for connecting and disconnecting the motors to a source of electric power instead of to a source of motive fluid. Therefore, the fluid supply comprising the nozzle 53' is to be considered illustrative of a power station for the motors.

It will be understood that the conveyor carries a plurality of lasting units and that each lasting unit is brought into registry with the motive fluid supply, comprising the nozzle 53', and with the motive fluid exhaust, comprising the bar 72. It will be understood further that each lasting unit is carried into a first position for alignment of the valve 51 of the motor M—1 with the nozzle 53' of the motive fluid supply, and subsequently into a second position for alignment of the valve 51 of the motor M—2 with said nozzle. This arrangement assures the operation of the motors in proper sequence, but in lieu of moving a lasting unit to two positions for successive engagement of the nozzle 53' with each valve 51 on a lasting unit, two independently operated nozzles may be provided and spaced so each is aligned with a valve 51 on a lasting unit when the latter is carried into fluid supply position, thus eliminating the necessity for two positions of a lasting unit with respect to the fluid supply and consequently eliminating one operation of the conveyor and its driving means.

Provision is made for obtaining the proper alignment of the valves 51 with the fluid supply, specifically the nozzle 53' and for stopping the conveyor when said alignment is obtained. For this purpose the apparatus is provided with a switch 80 which controls the circuit of the motor that drives the conveyor. Said switch has a pivoted operating lever 81 which extends into the path of each of two stop members 82 on the base 12 of each lasting unit. Each stop member 82 is pivotally mounted on a bracket 83 in position to engage the switch lever 81. Each stop member is in position to engage the switch lever to interrupt the motor circuit to stop the conveyor in position to align the valve 51 with the nozzle 53'. It will be understood that the switch lever 81 may be biased to circuit-closing position whereby to close the circuit automatically when the stop member 82 is retracted, as indicated in dotted lines, to release the switch lever. It will be observed that when a valve 51 of one lasting unit is aligned with the nozzle 53' for engagement by the latter to supply motive fluid to the motor M—1, valves 51 on the adjacent unit are aligned with the bar 72 for engagement thereby for releasing the motive fluid from both motors on said unit. A manually-controlled switch 85 may be provided, if desired, for starting and stopping the motor and the conveyor driven thereby independently of the automatic switch 80. Circuit controllers or switches suitable for the purposes of switches 80 and 85 in the present apparatus are well known and need no further description as they are, per se, not part of the present invention.

In the operation of the multi-unit lasting apparatus, assuming that a lasting unit U—1 with a shoe thereon has arrived at the fluid supply position illustrated and the conveyor is, therefore, at rest, the operator performs the operations on the shoe as described above in connection with Figures 1 to 4. In preforming these operations, the operator first actuates the treadle 70 to bring the nozzle 53' into engagement with the valve 51 to supply motive fluid to the motor M—1 to actuate the side clamps 10, and after said clamps are brought into position to clamp or hold the upper, the treadle is released. After the tacks are removed from the marginal side portions *a* of the upper and the latter are treated with a roughening tool and with an adhesive as described, the conveyor is set into motion until the valve 51 of the motor M—2 is in alignment with the nozzle 53' when the companion stop member 82 engages the switch lever 81 to interrupt the motor circuit and stop the conveyor. The treadle 70 is then operated to bring the nozzle 53' into engagement with the valve 51 of the motor M—2 to actuate the clamp-wipers 11, and after said clamps 11 are brought into proper position the treadle is released. The lasting unit U—1 is then moved out of the fluid supply position and its place is taken by the following lasting unit U—2 and the above described lasting operations are performed on the shoe carried by this unit. Similarly, each unit is carried to the fluid supply position and the shoe thereon is treated in the same way. Finally, as the conveyor is of the endless type, U—1 arrives at the fluid release posion and during the travel of said unit from the fluid supply position to the fluid exhaust position, the cement between the upper and the insole has set whereby a good adhesive bond or permanent adhesive connection between the upper and insole is obtained. The lasted shoe is then removed from the lasting unit for further treatment in the usual method of finishing the shoe and another shoe is placed on said unit which is then carried to the fluid supply position.

Figure 9:
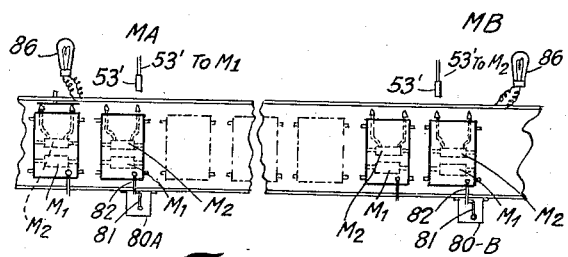
Figure 9 is a top plan view, more or less diagrammatic, of a multi-unit lasting apparatus.

In making cemented shoes, it is desirable that the operator who applies the adhesive should handle the shoes as little as possible whereby to prevent staining of the uppers. The above described process eliminates a great deal of the handling of the shoe, which is necessary in prior methods, and handling of the shoe by the operator who applies the cement can be further reduced in a practical manner by limiting his duties to the application of the cement and the actuation of the apparatus to operate the clamp-wipers 11. Thus, one operator at one position can exhaust the air from a lasting unit, in its final position, remove the shoe therefrom, insert a new shoe, actuate the side clamps, remove the tacks and roughen the upper to condition it for the cement. Then the second operator can apply the cement and actuate the clamp-wipers. This may be accomplished on a multi-lasting apparatus of the type shown in Figure 8 by providing said apparatus with two fluid-supply positions spaced from each other by a plurality of, say four lasting units, as illustrated in Figure 9, at MA and MB. At position MA, the first operator performs his duties as described above, and motive-fluid is supplied preferably only to motor M—1, and at position MB, the second operator performs his duties and motive fluid is supplied preferably only to motor M—2, the nozzle 53' at station MA being so positioned as to be in alignment only with the valve of motor M—I when the conveyor is brought to rest by engagement of the stop member 82 with the switch lever 81 of the switch 80A and the nozzle 53' at station MB being so positioned as to be in alignment only with the valve of motor M—2 when the conveyor is brought to rest by engagement of the stop member 82 with the switch lever 81 of the switch 80B. In this apparatus only one stop member is provided on each lasting unit. The switches 80A and 80B may be of the same construction as the switch 80 in Figure 8, but it is desirable to subject the operation of one switch to the control of the other switch. For this purpose switches 80A and 80B are in series circuit relation so that the switch at one station cannot be operated to start the conveyor until the operator at the other station closes the switches at his station. Switches and circuit controllers suitable for this purpose are well known and further description is unnecessary as they are, per se, not part of the present invention. A suitable signal, such as a lamp 86 may be provided at station MA to inform the first operator when the operator at station MB has finished with the lasting unit at his station so that the conveyor can be operated to bring the next lasting unit to his position. Said lamp 87 may be operated under the control of the switch 80B so as to light when said switch is closed. A similar lamp under the control of switch 80A may be located at station MB. Thus, when a last unit has arrived at station MB and has opened switch 80B, the conveyor will remain at rest and cannot be moved until the operator has released the switch lever from the stop member on the lasting unit and until the operator at station MA has released the switch lever of switch 80A from the stop member on the lasting unit at station MA. When both switches thus released are closed, the conveyor will start and carry another lasting unit to each station.

It is to be understood that the herein disclosed apparatus, while preferred in the practice of the present invention and while contributing to the results accomplished by the present method, is not exhaustive of the instrumentalities which may be availed of in practicing this method, and other devices may be substituted in whole or in part for this apparatus or certain parts only thereof may be used as may be found desirable or necessary in performing the several steps of the method. It will be understood also that, unless otherwise specified, the steps of the method need not be performed in precisely the order in which they are recited, and that unless otherwise specified one or more steps may be performed without the others or with the equivalent of the specific steps which may be omitted. Finally, it is to be understood that the present invention is not to be limited by the preceding specific disclosure as to the specific construction of the shoe, the method of treating the same, or the apparatus herein disclosed, except as may be required by the appended claims and the prior art.

Having described my invention, what I claim and desire to secure by Letters Patent is:

1. The method of making shoes which comprises first lasting the upper and temporarily securing the marginal side portions thereof at the shoe bottom on a last, positioning said last and upper assembly at one station, clamping the sides of the upper, then releasing said marginal side portions and rendering them adhesive while holding the upper clamped against the sides of the last, moving said assembly to another station, and then wiping said marginal side portions of the upper over the shoe bottom in engagement therewith to permanently adhesively unite said marginal side portions to the shoe bottom, and releasing the clamped portion of the upper.

2. The method of making shoes which comprises first lasting the upper and temporarily securing the marginal side portions thereof at the shoe bottom on a last, positioning said last and upper assembly at one station, clamping the sides of the upper, then releasing said marginal side portions and rendering them adhesive while holding the upper clamped against the sides of the last, moving said assembly to another station, and then simultaneously wiping said marginal side portions of the upper over the shoe bottom in engagement therewith to permanently adhesively unite said marginal side portions to the shoe bottom, and releasing the clamped portion of the upper.

RALPH DE LISO